United States Patent
Mollenbeck

[15] 3,679,974
[45] July 25, 1972

[54] DEVICE FOR MEASURING CURRENTS IN A HIGH VOLTAGE CONDUCTOR INCLUDING A CONTROLLED OPTICAL ARRANGEMENT

[72] Inventor: Klaus Mollenbeck, Berlin, Germany
[73] Assignee: Siemens Aktiengesellschaft, Berlin, Germany
[22] Filed: July 24, 1970
[21] Appl. No.: 58,032

[30] Foreign Application Priority Data
Aug. 1, 1969 Germany.................. P 19 39 912.3

[52] U.S. Cl..............................324/96, 250/199
[51] Int. Cl..........................................G01n 31/00
[58] Field of Search..................324/96, 97; 250/199

[56] References Cited

UNITED STATES PATENTS
3,419,802  12/1968  Pelenc et al.....................324/96

FOREIGN PATENTS OR APPLICATIONS
24,202   4/1966   Japan.............................250/199

OTHER PUBLICATIONS

Moulton, Clifford H.: Light Pulse System Shrinks High-Voltage Protection Device; Electronics; May 17, 1965; pp. 71–75.

Primary Examiner—Alfred E. Smith
Attorney—Curt M. Avery, Arthur E. Wilfond, Herbert L. Lerner and Daniel J. Tick

[57] ABSTRACT

A control unit derives a control magnitude from a current to be measured in a high voltage conductor. A controlled optical arrangement utilizes the control magnitude for converting a light beam into light pulses having an information content corresponding to the current to be measured. A light beam is directed into the controlled optical arrangement. A receiver converts the light pulses to output signals corresponding to the current to be measured. The controlled optical arrangement comprises an electro-optical or a magneto-optical device including a double refractor or a polarization plane rotator for transverse double refracting and rotating of the plane of polarization of the light beam. A polarizer polarizes the light beam after rotation of the plane of polarization thereof.

15 Claims, 6 Drawing Figures

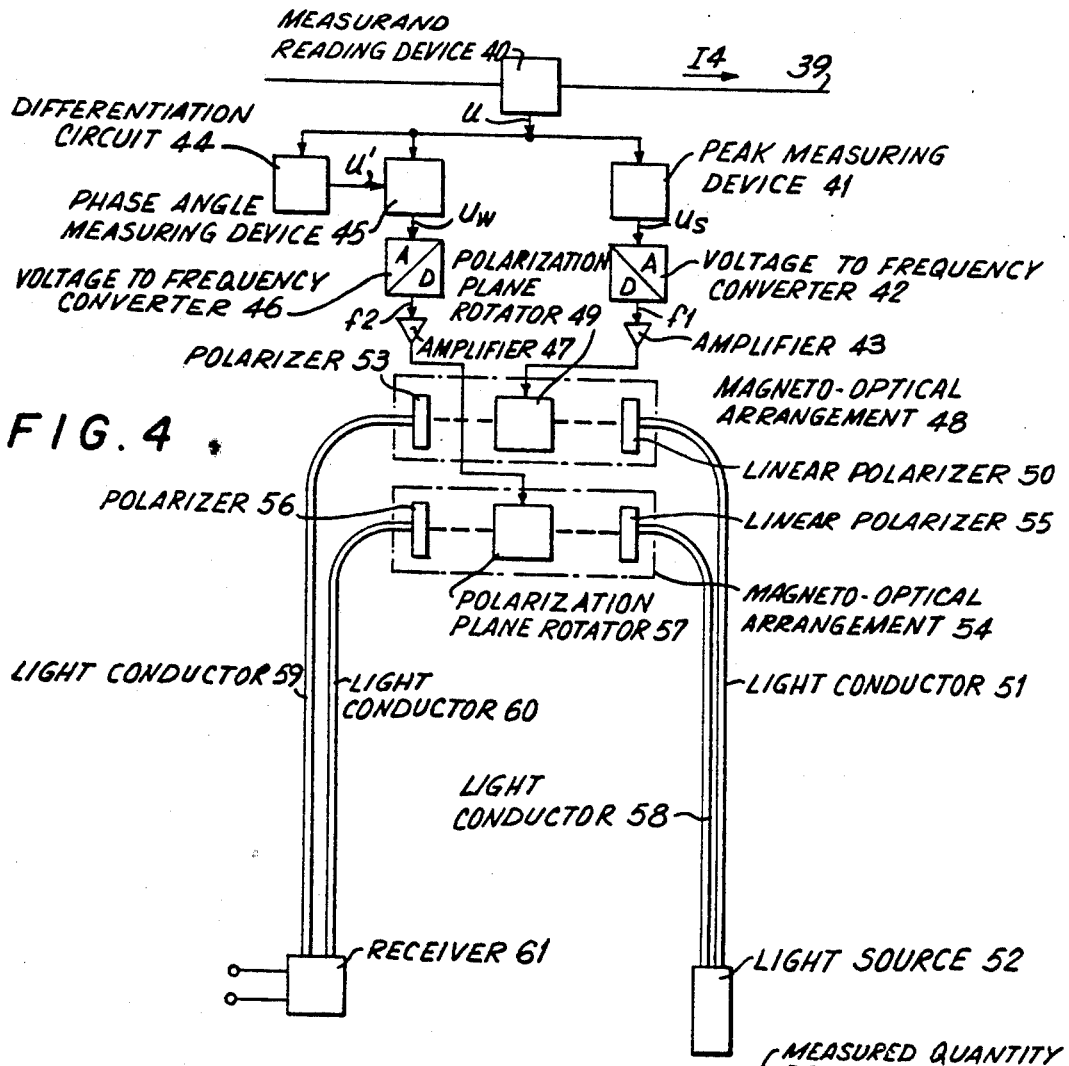
FIG. 4
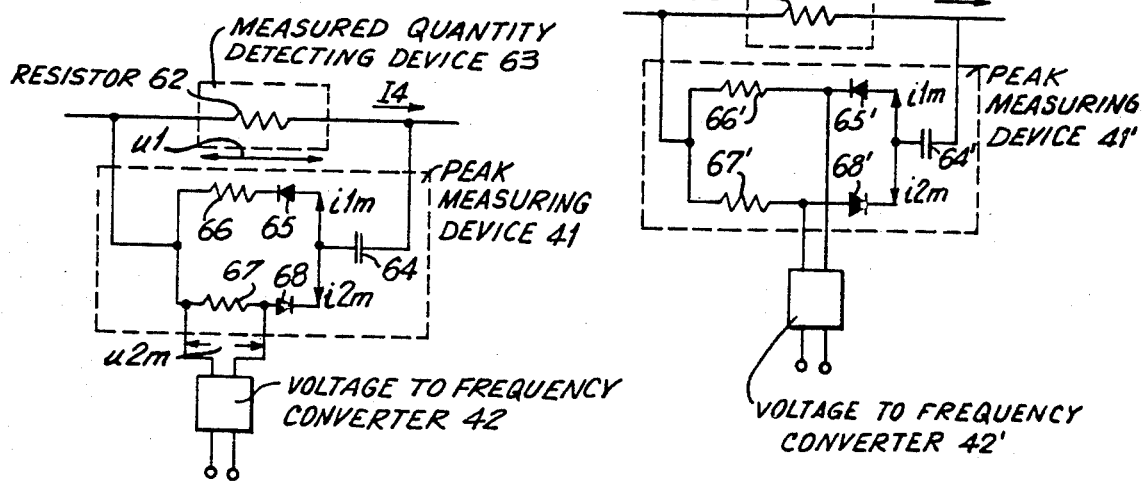
FIG. 5
FIG. 6

– 3,679,974 –

DEVICE FOR MEASURING CURRENTS IN A HIGH VOLTAGE CONDUCTOR INCLUDING A CONTROLLED OPTICAL ARRANGEMENT

DESCRIPTION OF THE INVENTION

The invention relates to a device for measuring currents. More particularly, the invention relates to a device for measuring currents in a high voltage conductor and for transferring measured values from a high voltage side of the device to a low voltage side of the device in the form of light pulses.

In a known current measuring device of the type of the invention, a light beam is emitted by a source of light at the low voltage side of the device. The light beam is directed by reflectors, at the high voltage side of the device, to a diaphragm comprising a perforated disc. The disc closes the path of the beam and opens it at a rhythm which increases with an increase in the magnitude or intensity of current in a high voltage conductor. Light beams thus modulated, after a pulse frequency process, impinge upon photocells at the low voltage side of the device. The photocells convert the modulated light beams into a measurement or signal having a magnitude which is proportional to the current to be measured in the high voltage conductor.

The known current measuring device has a disadvantage, primarily because a perforated disc is utilized for pulse frequency modulation of the light beam. The disc rotates at a speed proportional to the current to be measured in the high voltage conductor. The appreciable mass of the perforated disc prevents it from instantaneously following in speed abrupt or sudden strong variations in the current to be measured. Thus, in the known current measuring device, sudden or rapid variations in the current to be measured are not transferred to the receiver at the low voltage side of the device and are not properly measured.

The principal object of the invention is to provide a new and improved device for measuring currents in a high voltage conductor.

An object of the invention is to provide a device for measuring currents in a high voltage conductor, which device overcomes the disadvantage of known similar current measuring devices.

An object of the invention is to provide a device for measuring currents in a high voltage conductor with accuracy, efficiency, effectiveness and reliability.

An object of the invention is to provide a device for measuring currents in a high voltage conductor through abrupt or rapid variations in the currents to be measured, with accuracy, effectiveness, efficiency and reliability.

In accordance with the invention, a device for measuring currents in a high voltage conductor and for transferring measured values from a high voltage side of the device to a low voltage side of the device in the form of light pulses comprises control means for deriving a control magnitude from a current to be measured in the high voltage conductor. Controlled optical means at the high voltage side of the device utilizes the control magnitude for converting a light beam into light pulses having an information content corresponding to the current to be measured. Light means directs a light beam into the controlled optical means. Receiver means at the low voltage side of the device converts the light pulses to output signals corresponding to the current to be measured.

The controlled optical means may comprise electro-optical means including double refracting means for transverse electrical double refracting of the light beam. The controlled optical means may comprise magneto-optical means including double refracting means for transverse magnetic double refracting of the light beam.

The controlled optical means may comprise electro-optical means including polarization plane rotating means for electrically rotating the plane of polarization of the light beam and polarizer means for polarizing the light beam after rotation of the plane of polarization thereof. The controlled optical means may comprise magneto-optical means including polarization plane rotating means for magnetically rotating the plane of polarization of the light beam and polarizer means for polarizing the light beam after rotation of the plane of polarization thereof.

The light means comprises a light source at the low voltage side of the device and reflector means for directing the light beam from the light source to the controlled optical means, and may comprise light conducting fiber bundles for directing the light beam from the light source to the controlled optical means.

The receiver comprises photoresponsive means and a digital to analog converter connected in series with the photoresponsive means.

The control means comprises an analog to digital converter, input means for supplying the current to be measured to the analog to digital converter and amplifier means for transferring the control magnitude derived by the analog to digital converter to the controlled optical means.

The analog to digital converter of the control means comprises a first analog to digital converter for producing pulses having amplitudes of information content corresponding to the current to be measured and a second analog to digital converter for producing pulses having an information content corresponding to the time positions of specific amplitude values. The controlled optical means includes a plurality of double refracting means each coupled to a corresponding one of the first and second analog to digital converters for producing two series of light pulses. The controlled optical means may include a plurality of polarization plane rotating means each coupled to a corresponding one of the first and second analog to digital converters for producing two series of light pulses.

Input means supplies the current to be measured to the analog to digital converter of the control means. The analog to digital converter of the control means further comprises a peak value measuring device connected between the input means and the first analog to digital converter whereby the current to be measured is supplied to the peak value measuring device. The first analog to digital converter produces pulses having an information content corresponding to the peak values of the current to be measured and the second analog to digital converter produces pulses having an information content corresponding to the time positions of the peak values of the current to be measured.

The peak value measuring device of the analog to digital converter of the control means comprises a pair of parallel circuit branches having rectifiers connected in antiparallel and a capacitor connected in series with the parallel circuit branches. The currents in both circuit branches are utilized for measuring the current to be measured in order to suppress the adverse influence of a rectifier when a dislocated short-circuit is measured.

The analog to digital converter of the control means further comprises measuring voltage means for providing a measuring voltage proportional to the current to be measured and differentiating means coupling the measuring voltage means to the second analog to digital converter. The analog to digital converter of the control means further comprises phase angle measuring means connected between both the measuring voltage means and the differentiating means and the second analog to digital converter whereby the phase angle measuring means produces an output voltage having a magnitude proportional to the phase angle between the measuring voltage and the output voltage of the differentiating means.

Each of the first and second analog to digital converters comprises a voltage to frequency converter.

In the current measuring device of the invention, light pulses are produced by electro-optical or magneto-optical means, thereby providing inertia-free measurement of the current in a high voltage conductor and a transfer of the measured values from the high voltage side of the device to the low voltage side of the device. Another advantage of the current measuring device of the invention is that a usual source of light, having a long life span, may be utilized, since there is no control of the light source in order to produce the light pulses. Rather, the light beam itself is modulated to produce the light pulses. Thus, luminescence or laser diodes suitable for high pulse frequency scanning, may be eliminated. Such diodes are required in the known types of current measuring devices for measuring currents in high voltage conductors and for transferring the measured value in the form of light pulses. The diodes have the disadvantage of a relatively short life span and are limited in pulse frequency to approximately 1 megahertz.

The controlled optical arrangement may comprise an electro-optical or magneto-optical arrangement having a transverse electrical or magnetic double refracting component such as, for example, a component providing the Cotton-Mouton effect. The double refractor thus deflects the light beam directed to the controlled optical arrangement in pulses, in accordance with the current to be measured and in a manner whereby the light pulses may be converted in a receiver at the low voltage side of the device. The controlled optical arrangement may also comprise an electrical or magnetic polarization plane rotating device for electrically or magnetically rotating the plane of polarization of the light beam. A polarizer is included in the controlled optical arrangement for polarizing the light beam after the rotation of the plane of polarization thereof. The polarization plane rotator may comprise, for example, a structural component which provides the Pockels or Faraday effect. A particularly suitable polarization plane rotator is a YIG modulator, containing yttrium-iron-garnet, as the active material.

The number of polarizers in the controlled optical arrangement depends widely upon the design of the light source. If the light source is, for example, a conventional glow lamp or neon tube, a polarizer is utilized between said light source and the controlled optical component in order to provide a linearly polarized light beam. If the light source is a laser, however, which provides linearly polarized light, then a polarizer may be dispensed with between the light source and the controlled electro-optical or magneto-optical arrangement. A polarizer may then be included in the controlled optical arrangement.

The controlled optical arrangement or the electro-optical or magneto-optical arrangement may include a component which provides the magneto-optical Kerr effect. Such a component comprises, for example, a metal mirror or reflector which reflects a linearly polarized light beam and thereby elliptically polarizes said light beam. If the metal mirror reflects the light beam in a magnetic field proportional to the current to be measured, the reflected or oscillated ellipse is rotated and distorted and becomes a measure of the current to be measured and may be utilized in a suitable receiver at the low voltage side of the device.

The light source which produces the light beam may be positioned at various points. Thus, for example, the light source may be derived from a high voltage source. This may be done only to safeguard the current supply without particular difficulties and additional costs. It is preferable, however, to position the light source at the low voltage side of the device, since the current supply is much easier to provide at the low voltage side than at the high voltage side. Furthermore, when the light source is at the low voltage side of the device, a defective light source may be readily replaced without a requirement for disconnecting the high voltage conductor.

If the light source is at the low voltage side, the light beam emitted therefrom may be transferred to the controlled optical, electro-optical or magneto-optical arrangement at the high voltage side of the device by several means. The light beam may be transferred by reflectors. If economy is desired, an isolator, which is relatively expensive when operated at high voltages, may be eliminated by not encapsulating the optical transfer path, and by transferring the light beam via the free atmosphere. In such case, the transfer of the light beam may be impaired by haze, fog, mist, and the like. It may then be preferable to guide the light beam between the high voltage side and the low voltage side via a light conductor such as, for example, light conducting fiber bundles. The light conductor is preferably utilized when a glow lamp or neon tube is utilized as the light source. If a laser is utilized as the light source, a light conductor is less favorable, since such light conductor results in a loss in linear polarization of the emitted light beam. This would thus require an additional polarizer, especially when a Faraday element is utilized.

The analog to digital converter for deriving the control magnitude from the current to be measured in the high voltage conductor preferably supplies said control magnitude to the controlled optical arrangement in the form of pulses, via an amplifier. The pulses supplied by the analog to digital converter to the electro-optical or magneto-optical arrangement have an information content corresponding to the current to be measured. These pulses control the electro-optical or magneto-optical arrangement in accordance with the function thereof. That is, if the controlled optical arrangement comprises an electro-optical arrangement, the control pulses from the analog to digital converter function as voltage pulses in said electro-optical arrangement. If the controlled optical arrangement is a magneto-optical arrangement, the control pulses from the analog to digital converter function to produce a magnetic field in said magneto-optical arrangement.

The second analog to digital converter of the analog to digital converter is connected to the measuring voltage means via the differentiating means in order to provide a measurement value or signal having a zero passage at the peak value of the current to be measured. This permits the establishment of the time position of the peak value of the current to be measured relative to the zero passages of the current to be measured.

The digital to analog converter in the receiver shapes the electrical pulses or signals produced by the photoresponsive means so that the resultant low voltage output of said receiver is proportional to the current to be measured in the high voltage conductor.

In order that the invention may be readily carried into effect, it will now be described with reference to the accompanying drawings, wherein:

FIG. 4 is a schematic block diagram of an analog to digital converter;

FIG. 5 is a circuit diagram of an embodiment of a peak measuring device; and

FIG. 6 is a modification of the peak measuring device of FIG. 5.

Figure 1:
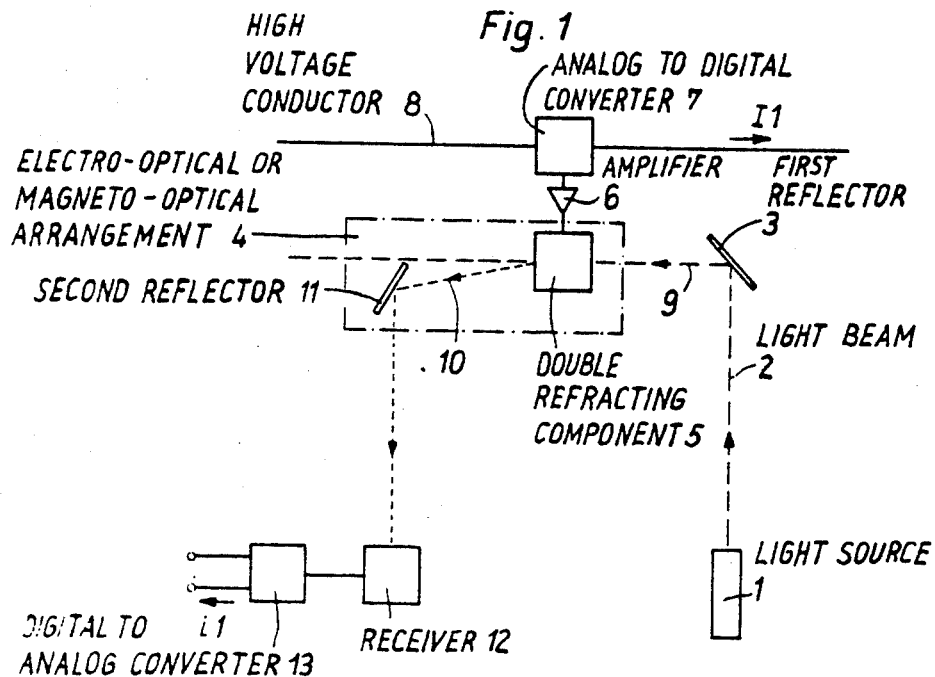
FIG. 1 is a schematic block diagram of an embodiment of the device of the invention for measuring currents in a high voltage conductor.

The embodiment of the current measuring device of FIG. 1 comprises a light source 1 at the low voltage side of the device. The light source 1 may comprise, for example, a gas laser. The light source 1 produces or emits a light beam 2, which is linearly polarized and is directed toward a first reflector 3. The first reflector 3 directs the light beam 2 toward a controlled optical arrangement 4 which comprises an electro-optical or magneto-optical arrangement.

The electro-optical or magneto-optical arrangement 4 comprises a double refracting component 5 which provides an electric or magnetic transverse double refraction of the light beam 9. The double refracting component 5 is charged or operated by pulses produced by an analog to digital converter 7 connected in a high voltage conductor 8 through which the current 11 to be measured flows. The pulses produced by the analog to digital converter 7 are supplied to the double refracting component 5 of the controlled optical arrangement 4 via an amplifier 6. The analog to digital converter 7 is controlled by the current 11 to be measured in the high voltage conductor 8, so that the pulses produced by said converter have an information content corresponding to the magnitude of said current to be measured. The pulses supplied to the double refracting component 5 by the analog to digital converter 7 produce an electric field or a magnetic field at said double refracting component, depending upon whether said double refracting component is an electric or a magnetic transverse double refracting component.

The double refracting component 5 deflects the light beam 9, as a light beam 10, in accordance with the electric or magnetic field corresponding to the current I1 to be measured and produced in said double refracting component. The deflected light beam 10 is directed by a second reflector 11 to a receiver 12. The receiver 12 converts the light pulses transmitted thereto from the second reflector 11 into electrical pulses or signals. The electrical pulses or signals have an information content corresponding to the current I1 to be measured in the high voltage conductor 8. The electrical pulses or signals are supplied from the receiver 12 to a digital to analog converter 13 which converts said pulses or signals into measurement values or output signals i1 proportional to the current I1. The output signals or currents i1 are an accurate representation of the current I1 to be measured and may therefore be compared to the secondary current of a transformer.

The current measuring device of the invention functions in the following manner. The analog to digital converter 7 supplies pulses having an information content corresponding to the current I1 to be measured to the double refracting component 5 of the electro-optical or magneto-optical arrangement 4, via the amplifier 6. Thus, when a pulse occurs, the double refracting component 5 is subjected to an electric or magnetic field and converts the impinging light beam 9 into a deflected light pulse 10. This continues for the duration of each pulse.

During the pulse intervals, the impinging light beam 9 is not influenced by the double refracting component 5, so that, under such circumstances, the light pulse 10 is not deflected and thus bypasses the second reflector 11. The light pulses 10 are thus transmitted past the second reflector 11 and dO not participate in the provision of the measurement values or output signals at the receiver 12. When a pulse is supplied to the electro-optical or magneto-optical arrangement 4 by the analog to digital converter 7, the deflected light pulses 10 are supplied to the receiver 12, via the second reflector 11.

Figure 2:
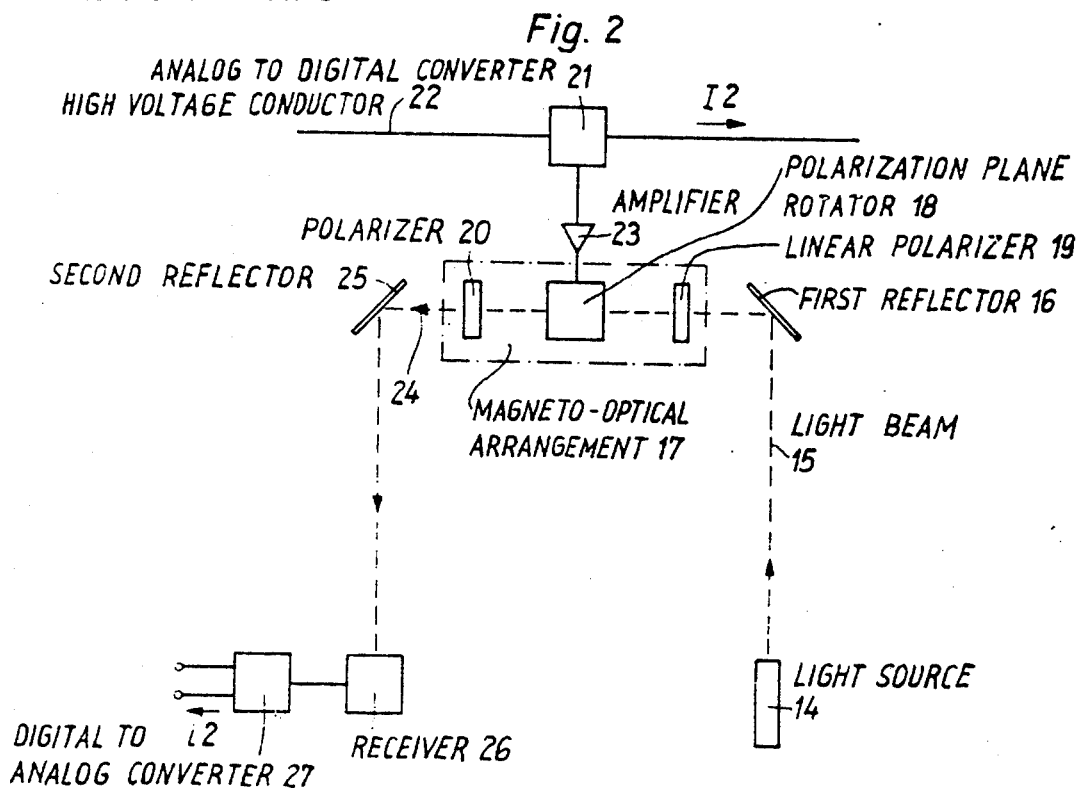
FIG. 2 is a schematic block diagram of another embodiment of the device of the invention for measuring currents in a high voltage conductor.

In the embodiment of FIG. 2, a light source 14, at the low voltage side of the device, emits a light beam 15 which is directed toward a first reflector 16. The first reflector 16 directs the light beam 15 to a controlled optical arrangement 17 which may comprise a magneto-optical arrangement. The magneto-optical arrangement 17 includes a polarization plane rotator 18 which magnetically rotates the plane of polarization of the light beam 15 by the Faraday effect.

A linear polarizer 19 is provided in the magneto-optical arrangement 17 between the polarization plane rotator and the first reflector 16. The linear polarizer 19 linearly polarizes the impinging light beam 15. The linear polarizer 19 may be omitted, if necessary, when, for example, a gas laser is utilized as the light source 14, since the gas laser emits linearly polarized light. A polarizer 20 is included in the magneto-optical arrangement 17, positioned between the polarization plane rotator 18 and a second reflector 25. The plane of polarization of the polarizer 20 is perpendicular to the plane of polarization of the linear polarizer 19. Consequently, the impinging light beam 15 cannot pass through the magneto-optical arrangement 17 when the polarization plane rotator 18 is inactive. In such case, the magneto-optical arrangement 17 will not transmit a light beam.

When the polarization plane rotator 18 of the magneto-optical arrangement 17 is activated, energized or operated, it functions to produce a magnetic rotation of the plane of polarization of the light beam. In the embodiment of FIG. 2, the polarization plane rotator 18 is operated under the control of a control magnitude or signal produced by an analog to digital converter 21 connected in a high voltage conductor 22 through which a current I2 to be measured flows. The analog to digital converter 21 produces pulses having an information content corresponding to the current I2 to be measured. The control pulses produced by the analog to digital converter 21 are supplied to the polarization plane rotator 18 of the magneto-optical arrangement 17 via an amplifier 23. It is necessary that the amplified control pulses from the analog to digital converter 21 produce a magnetic field in the polarization plane rotator 18 in order to rotate the plane of polarization. This is due to the fact that the plane of polarization may be rotated only by the action of a magnetic field.

The control pulses supplied from the analog to digital converter 21 to the polarization plane rotator 18 of the magneto-optical arrangement 17 result in the rotation of the plane of polarization of the light beam 15. Due to the perpendicular alignment of the planes of polarization of the polarizers 19 and 20 of the magneto-optical arrangement 17, a light beam 24, which is emitted by said magneto-optical arrangement for the duration of a control pulse, impinges upon a second reflector 25. The second reflector 25 directs the light pulses 24 to a receiver 26 which converts said light pulses to electrical pulses or Signals. The electrical pulses or signals are supplied to a digital to analog converter 27 connected in series with the receiver 26. The digital to analog converter 27 converts the electrical pulses to output signals or currents i2 corresponding in magnitude to the current I2 to be measured. The output current i2 corresponds exactly to the current I2 to be measured.

Figure 3:
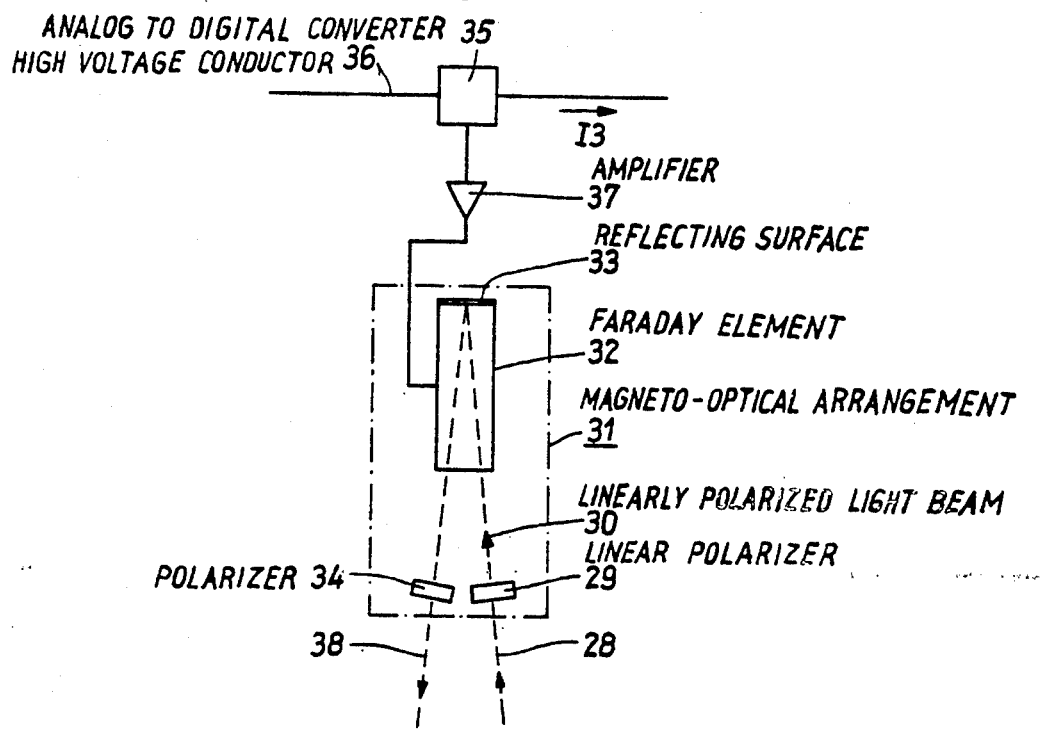
FIG. 3 is a schematic block diagram of another embodiment of the device of the invention for measuring currents in a high voltage conductor.

The embodiment diment of FIG. 3 eliminates the reflectors of the embodiments of FIGS. 1 and 2. The low voltage side of the embodiment of FIG. 3 corresponds to the low voltage side of the embodiments of each of FIGS. 1 and 2 and is therefore not illustrated in FIG. 3 in order to maintain the clarity of illustration. FIG. 3 illustrates only the high voltage side of the embodiment thereof.

In the embodiment of FIG. 3, a light beam 28, emitted from a light source at the low voltage side of the device, is directed to a linear polarizer 29 of a controlled optical arrangement 31 which may comprise a magneto-optical arrangement. The linear polarizer 29 converts the light beam 28 into a linearly polarized light beam 30. The linear polarizer 29 is thus necessary when an ordinary source of light is utilized and is unnecessary when a source of light is utilized which emits a linearly polarized light beam.

The linearly polarized light beam 30 is directed into a Faraday element 32. The Faraday element 32 has a mirrored or reflecting surface 33 which reflects the light beam 30 and directs said light beam to a polarizer 34. The plane of polarization of the linear polarizer 29 and the plane of polarization of the polarizer 34 are perpendicular to each other, as in the embodiment of FIG. 2. Thus, when the Faraday element is inactive, unenergized, or the like, the impinging light beam 28 does not emerge from the magneto-optical arrangement 31.

An analog to digital converter 35 is connected in a high voltage conductor 36 through which a current I3 to be measured flows. The analog to digital converter 35 produces control pulses having an information content corresponding to the current I3 to be measured in the high voltage conductor 36. The control pulses produced by the analog to digital converter 35 are amplified by an amplifier 37 and are applied to the Faraday element 32, wherein they produce a magnetic field. The magnetic field produced by the control pulses from the analog to digital converter 35 in the Faraday element 32 produces a magnetic rotation of the plane of polarization of the linearly polarized light beam 30. The Faraday element 32 emits a light pulse, which is polarized by the polarizer 34 and is directed to the receiver at the low voltage side of the device (not shown in FIG. 3). The receiver at the low voltage side of the device converts the light pulses 38 into an output current or signal corresponding in magnitude to the current I3 to be measured.

The current measuring device of the invention measures the currents in a high voltage conductor by transferring the measurement values in the form of light pulses. The pulse modulation is preferably not provided by appropriate control of a light source, but, on the contrary, the light beam itself is modulated. This provides the advantage that a usual source of light or a gas laser, having a long life span, may be utilized, and the frequency characteristics of the light source need not be considered. Thus, the current measuring device of the invention eliminates the need for luminescence or laser diodes, which diodes are required in known types of current measuring devices due to the high pulse frequencies involved.

The current measuring device of the invention may utilize a light source which is at ground potential. Furthermore, the current measuring device of the invention provides an inertia-free measurement, as compared to known types of current measuring devices which utilize rotating perforated discs.

FIG. 4 is a schematic block diagram of an analog to digital converter which may be utilized as the analog to digital converter 7 of FIG. 1, the analog to digital converter 21 of FIG. 2 and the analog to digital converter 35 of FIG. 3. The circuit of FIG. 4 includes a measurand reading or detecting device 40, which is influenced by a current I4 to be measured. The current I4 to be measured flows through a high voltage conductor 39. In the measurand or measured value detecting device 40, a voltage $u$ is derived from the current I4 to be measured, and is proportional to such current.

The voltage $u$ is applied to a peak measuring device 41, which measures the peak value of said voltage and provides an output voltage $u_s$. The output voltage $u_s$ has a magnitude proportional to the respective peak value of the current I4 to be measured. The voltage $u_s$ is applied to the input of an analog to digital converter 42, designed, for example, as a voltage to frequency converter. The converter 42 produces an output pulse sequence having a frequency $f1$, which is proportional to the respective peak value of the current I4 to be measured. The pulse sequence having a frequency $f1$ is supplied to an amplification circuit or amplifier 43.

The measuring voltage $u$, derived by the measurand detecting device 40 from the current I4 to be measured, is also applied at the input of a differentiation circuit 44 and to an input of a phase angle measuring device 45. The differentiation or differentiating circuit 44 produces an output voltage $u'$. The voltage $u'$ is supplied to another input of the phase angle measuring device 45. The voltage $u'$ corresponds to a first deviation of the measuring voltage $u$, in accordance with time.

The phase angle measuring device 45 produces a voltage $u_w$ from the measuring voltage $u$ and the output voltage $u'$ of the differentiation circuit 44. The voltage $u_w$ produced by the phase angle measuring device 45 is proportional to the phase angle between the voltages $u$ and $u'$ and thus indicates the first position of the peak value of the current I4 to be measured, relative to the zero passages. The output voltage $u_w$ of the phase angle measuring device 45 is supplied to the input of another analog to digital converter 46 which comprises, for example, a voltage to frequency converter. The voltage to frequency converter 46 produces an output pulse sequence having a frequency $f2$ which is proportional to the voltage $u_w$. The output of the voltage to frequency converter 46 is connected to the input of another amplifier 47.

The pulses produced by the analog to digital converter 42 are supplied to the input of a magneto-optical arrangement 48 via the amplifier 42. The output of the analog to digital converter 46 is supplied to the input of another magneto-optical arrangement 54. The magneto-optical arrangements 48 and 54 are identical to each other and are the same as the magneto-optical arrangement 17 of the embodiment of FIG. 2.

The magneto-optical arrangement 48 comprises a polarization plane rotator component 49, to which the output of the amplifier 43 is supplied. The polarization plane rotator 49 rotates the polarization plane in accordance with the Faraday effect. A linear polarizer 50 is positioned before the polarization plane rotator 49 and functions to linearly polarize a light beam transmitted from a light source 52. The light beam transmitted from the light source 52 is transmitted to the linear polarizer 50 via a light conductor 51. If the light source 52 comprises a gas laser, the linear polarizer 50 may be eliminated, since a gas laser emits linearly polarized light. A suitable light conductor must be utilized with the gas laser. A polarizer 53 is provided after the polarization plane rotator 49. The polarizer 53 has magneto-optical characteristics and a polarization plane which is perpendicular to that of the linear polarizer 50.

The magneto-optical arrangement 54, as hereinbefore stated, is the same as the magneto-optical arrangement 48 and comprises the same components. The magneto-optical arrangement 54 thus comprises a linear polarizer 55, a polarization plane rotator 57 and a polarizer 56. Light transmitted from the light source 52 is transmitted to the linear polarizer 55 via a light conductor 58.

Due to the alignment, as shown, of the polarizing planes of the polarizers 50 and 53 of the magneto-optical arrangement 48, a light beam is emitted by said magneto-optical arrangement for the duration of an electric output pulse of the amplifier 43 and is transmitted via a light conductor 59 to a receiver 61 at the low voltage side of the device. Due to the alignment, as shown, of the polarizing planes of the polarizers 55 and 56 of the magneto-optical arrangement 54, a light beam is emitted by said magneto-optical arrangement for the duration of an electric output pulse of the amplifier 47 and is transmitted via a light conductor 60 to the receiver 61. The receiver 61 produces electric pulses derived from the light pulses transmitted thereto via the light conductors 59 and 60. One series of electrical pulses corresponds to the amplitude of the current I4 to be measured and the other series of pulses corresponds to the phase angle of said current to be measured.

FIG. 5 is a circuit diagram of the peak measuring device 41 of the embodiment of FIG. 4. In FIG. 5, a current proportional to the current I4 to be measured flows through a measured quantity detecting device 63 comprising a resistor 62. The measured quantity detecting device 63 is connected to the peak measuring device 41. A voltage u1 is provided at the resistor 62 and is proportional to the current to be measured.

The peak measuring device 41 comprises a capacitor 64 connected in series circuit arrangement with a first circuit branch comprising a rectifier 65 and a resistor 66 and with a second circuit branch comprising a rectifier 68 and a resistor 67. The first circuit branch 65, 66 and the second circuit branch 68, 67 are connected in parallel with each other. A current $i1m$ flows through the first circuit branch 65, 66 and a current $i2m$ flows through the second circuit branch 68, 67. The currents $i1m$ and $i2m$ directly correspond to the peak value of the current I4 to be measured and to said current to be measured. The current $i2m$ produces a voltage drop $u2m$ at the resistor 67. The voltage drop $u2m$ triggers or operates the analog to digital converter 42.

FIG. 6 is a circuit diagram of a modification of the peak measuring device 41. The advantage of the modification of FIG. 6 is that it suppresses interference caused by short-circuits due to DC components. In the modification of FIG. 6, the voltage to frequency converter 42' is directly connected to the first circuit branch 65', 66' and is directly connected to the second circuit branch 68', 67' of the peak measuring device 41'. The circuit arrangement of FIG. 6 thus detects the peak-peak values of the current I4 to be measured. This renders harmless the DC components which superimpose the measuring current in the event of short-circuits. This eliminates interference with the measurement results.

While the invention has been described by means of specific examples and in specific embodiments, I do not wish to be limited thereto, for obvious modifications will occur to those skilled in the art without departing from the spirit and scope of the invention.

I claim:

1. A device for measuring currents in a high voltage conductor and for transferring measured values from a high voltage side of the device to a low voltage side of the device in the form of light pulses, said device comprising control means for deriving a control magnitude from a current to be measured in the high voltage conductor, said control means comprising an analog to digital converter having a first analog to digital converter for producing pulses having amplitudes of information content corresponding to the current to be measured and a second analog to digital converter for producing pulses having an information content corresponding to the time positions of specific amplitude values, input means for supply in the current to be measured to the analog to digital converter and amplifier means for transferring the control magnitude derived by the analog to digital converter to controlled optical means;

controlled optical means at the high voltage side of the device utilizing said control magnitude for converting a light beam into light pulses having an information content corresponding to the current to be measured, said controlled optical means including a plurality of double refracting means each coupled to a corresponding one of said first and second analog to digital converters for producing two series of light pulses;

light means for directing a light beam into said controlled optical means; and receiver means at the low voltage side of the device for converting said light pulses to output signals corresponding to the current to be measured.

2. A device as claimed in claim 1, wherein said controlled optical means comprises electro-optical means including double refracting means for transverse electrical double refracting of said light beam.

3. A device as claimed in claim 1, wherein said controlled optical means comprises magneto-optical means including double refracting means for transverse magnetic double refracting of said light beam.

4. A device as claimed in claim 1, wherein said controlled optical means comprises electro-optical means including polarization plane rotating means for electrically rotating the plane of polarization of said light beam and polarizer means for polarizing the light beam after rotation of the plane of polarization thereof.

5. A device as claimed in claim 1, wherein said controlled optical means comprises magneto-optical means including polarization plane rotating means for magnetically rotating the plane of polarization of said light beam and polarizer means for polarizing the light beam after rotation of the plane of polarization thereof.

6. A device as claimed in claim 1, wherein said light means comprises a light source at the low voltage side of the device.

7. A device as claimed in claim 1, wherein said light means comprises a light source at the low voltage side of the device and reflector means for directing the light beam from said light source to said controlled optical means.

8. A device as claimed in claim 1, wherein said light means comprises a light source at the low voltage side of the device and light conducting fiber bundles for directing the light beam from said light source to said controlled optical means.

9. A device as claimed in claim 1, wherein said receiver means comprises photoresponsive means and a digital to analog converter connected in series with said photoresponsive means.

10. A device as claimed in claim 1, wherein said controlled optical means includes a plurality of polarization plane rotating means each coupled to a corresponding one of said first and second analog to digital converters for producinG two series of light pulses.

11. A device as claimed in claim 1, further comprising input means for supplying the current to be measured to the analog to digital converter of said control means and wherein the analog to digital converter of said control means further comprises a peak value measuring device connected between said input means and said first analog to digital converter whereby the current to be measured is supplied to said peak value measuring device and said first analog to digital converter produces pulses having an information content corresponding to the peak values of the current to be measured and said second analog to digital converter produces pulses having an information content corresponding to the time positions of the peak values of the current to be measured.

12. A device as claimed in claim 11, wherein the peak value measuring device of the analog to digital converter of said control means comprises a pair of parallel circuit branches having rectifiers connected in antiparallel and a capacitor connected in series with said parallel circuit branches, the currents in both circuit branches being utilized for measuring the current to be measured in order to suppress the adverse influence of a rectifier when a dislocated short-circuit is measured.

13. A device as claimed in claim 12, wherein the analog to digital converter of said control means further comprises measuring voltage means for providing a measuring voltage proportional to the current to be measured, and differentiating means coupling said measuring voltage means to said second analog to digital converter.

14. A device as claimed in claim 13, wherein the analog to digital converter of said control means further comprises phase angle measuring means connected between both said measuring voltage means and said differentiating means and said second analog to digital converter whereby said phase angle measuring means produces an output voltage having a magnitude proportional to the phase angle between the measuring voltage and the output voltage of said differentiating means.

15. A device as claimed in claim 14, wherein each of said first and second analog to digital converters comprises a voltage to frequency converter.

* * * * *